(12) United States Patent
Lee et al.

(10) Patent No.: US 8,883,295 B2
(45) Date of Patent: Nov. 11, 2014

(54) BIODEGRADABLE FILM FOR ADVERTISEMENT

(75) Inventors: In Kee Lee, Seoul (KR); Seong Jin Kim, Suwon-si (KR)

(73) Assignee: LG Chem, Ltd. (KR)

( * ) Notice: Subject to any disclaimer, the term of this patent is extended or adjusted under 35 U.S.C. 154(b) by 811 days.

(21) Appl. No.: 12/499,202

(22) Filed: Jul. 8, 2009

(65) Prior Publication Data
US 2010/0009175 A1 Jan. 14, 2010

(30) Foreign Application Priority Data
Jul. 8, 2008 (KR) .................. 10-2008-0066217

(51) Int. Cl.
*B32B 5/02* (2006.01)
*B32B 7/12* (2006.01)
*B32B 27/08* (2006.01)
*B32B 27/12* (2006.01)
*B32B 27/20* (2006.01)
*B32B 27/30* (2006.01)
*B32B 27/32* (2006.01)
*B32B 27/36* (2006.01)
*B32B 27/40* (2006.01)
*C08L 67/00* (2006.01)
*C08L 67/02* (2006.01)
*C08L 67/03* (2006.01)
*C08L 67/04* (2006.01)
*G09F 17/00* (2006.01)
*G09F 15/02* (2006.01)

(52) U.S. Cl.
CPC ................ *B32B 27/36* (2013.01); *G09F 17/00* (2013.01); *B32B 27/12* (2013.01); *G09F 15/02* (2013.01)

USPC ........... 428/215; 428/212; 428/213; 428/216; 428/423.1; 428/423.7; 428/480; 428/483; 442/152; 442/164; 442/286; 442/287; 442/301; 442/394; 442/395; 442/414

(58) Field of Classification Search
None
See application file for complete search history.

(56) References Cited

U.S. PATENT DOCUMENTS 3,775,205 A * 11/1973 Hermann et al. ............... 156/72
5,294,469 A * 3/1994 Suzuki et al. ................ 428/36.1
5,300,576 A * 4/1994 Nemphos et al. ............. 525/190

(Continued)

FOREIGN PATENT DOCUMENTS

| EP | 1116748 | | 7/2001 |
| JP | 2000-014252 | * | 1/2000 |

(Continued)

OTHER PUBLICATIONS

Database WPI Week 200457, Thomson Scientific, London, GB; AN 2004-583990, XP002547570.

(Continued)

*Primary Examiner* — Vivian Chen
(74) *Attorney, Agent, or Firm* — Cantor Colburn LLP

(57) ABSTRACT

The present invention relates to a biodegradable film for advertisement. In the present invention, films, to which the biodegradable polymer is applied as a cover layer having excellent printability with respect to various solvent inks or bio inks, are used as materials for indoor or outdoor advertisement, such as banners and flexes. Therefore, the present invention can provide environment-friendly biodegradable materials for advertisement, which do not discharge harmful substances during incineration, and can be easily decomposed on landfill treatments.

6 Claims, 2 Drawing Sheets

(56) References Cited

U.S. PATENT DOCUMENTS

| | | | | |
|---|---|---|---|---|
| 5,391,423 A * | 2/1995 | Wnuk et al. | | 428/217 |
| 5,489,474 A * | 2/1996 | Shinoda et al. | | 428/343 |
| 5,702,826 A * | 12/1997 | Ehret et al. | | 428/515 |
| 5,783,504 A * | 7/1998 | Ehret et al. | | 442/395 |
| 5,849,401 A * | 12/1998 | El-Afandi et al. | | 428/215 |
| 5,851,937 A * | 12/1998 | Wu et al. | | 442/394 |
| 5,883,199 A * | 3/1999 | McCarthy et al. | | 525/437 |
| 5,910,545 A * | 6/1999 | Tsai et al. | | 525/178 |
| 5,914,188 A * | 6/1999 | Kobayashi et al. | | 428/331 |
| 5,939,467 A * | 8/1999 | Wnuk et al. | | 523/128 |
| 5,993,530 A * | 11/1999 | Tanaka et al. | | 106/206.1 |
| 6,045,908 A * | 4/2000 | Nakajima et al. | | 428/373 |
| 6,153,276 A * | 11/2000 | Oya et al. | | 428/35.2 |
| 6,235,825 B1 * | 5/2001 | Yoshida et al. | | 524/314 |
| 6,307,003 B1 * | 10/2001 | Grigat et al. | | 528/196 |
| 6,437,022 B1 * | 8/2002 | Yoshihara | | 523/128 |
| 6,740,184 B2 * | 5/2004 | Mortellite et al. | | 156/229 |
| 6,756,331 B2 * | 6/2004 | Kasemura et al. | | 442/327 |
| 6,787,613 B2 * | 9/2004 | Bastioli et al. | | 525/411 |
| 6,825,285 B2 * | 11/2004 | Autran et al. | | 525/418 |
| 6,869,985 B2 * | 3/2005 | Mohanty et al. | | 523/124 |
| 6,984,443 B2 * | 1/2006 | Kuroki et al. | | 428/220 |
| 7,067,596 B2 * | 6/2006 | Bastioli et al. | | 525/444 |
| 7,256,223 B2 * | 8/2007 | Mohanty et al. | | 523/124 |
| 7,265,188 B2 * | 9/2007 | Autran | | 525/439 |
| 7,452,927 B2 * | 11/2008 | Hayes | | 523/223 |
| 7,569,255 B2 * | 8/2009 | Dannhauser et al. | | 427/407.1 |
| 7,687,125 B2 * | 3/2010 | Gavel et al. | | 428/40.1 |
| 7,816,286 B1 * | 10/2010 | Ahmed | | 442/76 |
| 7,943,218 B2 * | 5/2011 | Knoerzer et al. | | 428/35.4 |
| 2002/0127358 A1 * | 9/2002 | Berlin et al. | | 428/36.6 |
| 2003/0102080 A1 * | 6/2003 | Mallik | | 156/325 |
| 2003/0113564 A1 * | 6/2003 | Noda et al. | | 428/480 |
| 2003/0153708 A1 * | 8/2003 | Caneba et al. | | 526/317.1 |
| 2004/0258857 A1 * | 12/2004 | Dagan et al. | | 428/32.6 |
| 2007/0014955 A1 * | 1/2007 | Tanley | | 428/40.1 |
| 2007/0088099 A1 * | 4/2007 | Mentink et al. | | 523/124 |
| 2007/0110925 A1 * | 5/2007 | Ridless | | 428/32.16 |
| 2008/0311813 A1 * | 12/2008 | Ting et al. | | 442/327 |

FOREIGN PATENT DOCUMENTS

| | | | |
|---|---|---|---|
| JP | 2002-356612 | * | 12/2002 |
| JP | 2003-039620 | * | 2/2003 |
| JP | 2003-048964 | * | 2/2003 |
| JP | 2004-188884 | * | 7/2004 |
| JP | 2005-036148 | * | 2/2005 |
| JP | 2007-262189 | | 10/2007 |
| JP | 2009-042692 | * | 2/2009 |
| WO | 2007/059408 | | 5/2007 |

OTHER PUBLICATIONS

Japanese Office Action—Japanese Application No. 2009-161177 issued on May 31, 2011, citing JP 2005-036148.

European Search Report—European Application No. 09008878.2 issued on Oct. 6, 2009.

* cited by examiner

BIODEGRADABLE FILM FOR ADVERTISEMENT

TECHNICAL FIELD

The present invention relates to a biodegradable film for advertisement.

BACKGROUND

Generally, materials for printing such as banners and flexes, which are widely used for outdoor or indoor advertisement, are manufactured by laminating soft poly(vinyl chloride) on one or both sides of a core layer.

As above, poly(vinyl chloride) is used as a cover layer in the traditional advertising materials for printing. Various additives such as plasticizer are added to the poly(vinyl chloride) in order to obtain various physical properties such as flexibility. Accordingly, endocrine disruptors such as phthalate are discharged during incinerating the advertising materials, and therefore there are problems to exert a bad influence on environment and human bodies.

Also, when the advertising materials are land-filled for disposal, it may take several hundred years to be decomposed in natural environment, or it is not almost decomposed, which is not desirable in appearance and causes environmental pollution.

In order to solve the above problems in disposing the conventional advertising materials, it has been suggested to add organotitanate or organozirconate amide adduct to poly(vinyl chloride) as a decomposition catalyst.

However, the above techniques are concepts to collapse the advertising materials. That is, the above techniques have effects to accelerate decompositions of the advertising materials, but they still have a problem in that endocrine disruptors such as phthalate are discharged during disposal.

DISCLOSURE

Technical Problem

The object of the present invention is to provide biodegradable films for advertisement.

Technical Solution

The present invention provides, as a means for achieving the object, a biodegradable film for advertisement, including a core layer; and a cover layer that is formed on one or both sides of the core layer, and includes a biodegradable polymer.

Advantageous Effects

In the present invention, films, to which the biodegradable polymer is applied as a cover layer having excellent printability with respect to various solvent inks or bio inks, are used as materials for indoor or outdoor advertisement, such as banners and flexes. Therefore, the present invention can provide environment-friendly biodegradable materials for advertisement, which do not discharge harmful substances during incineration, and can be easily decomposed on landfill treatments.

BEST MODE

Figure 1:
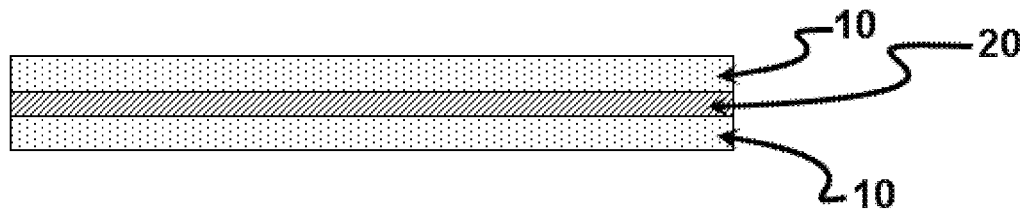
FIGS. 1 to 7 show schematics of various illustrative embodiments of biodegradable films for advertisement.

The present invention relates to biodegradable films for advertisement (hereinafter, referred to as "advertising film"), including a core layer; and a cover layer that is formed on one or both sides of the core layer and comprises a biodegradable polymer.

Hereinafter, the advertising film of the present invention will be described in detail.

The advertising film according to the present invention is characterized in that a film including a biodegradable polymer having excellent printability with respect to various solvent inks or bio inks is applied as a cover layer. In the present invention, the advertising film that does not discharge harmful substances such as endocrine disrupter, and can be easily decomposed in natural environment during incineration or landfill treatments can be provided, since the cover layer is constituted using a biodegradable polymer.

In the present invention, the kinds of the biodegradable polymers constituting the cover layer are not specially limited, as long as they do not discharge harmful substances on incineration or landfill treatment, can be easily decomposed in natural environment, and have an excellent printability with respect to various solvent inks and bio inks.

In one embodiment, at least one selected from the group consisting of poly(carprolactone) (PCL), poly(lactic acid) (PLA), poly(glycolic acid) (PG), poly(butylene succinate) (PBS) and poly(butylene adipate-co-terephthalate)(PBAT) may be used as the biodegradable polymer, but it is not limited thereto.

In the present invention, it is desirable that the cover layer includes at least one $1^{st}$ biodegradable polymer selected from the group consisting of poly(caprolactone) (PCL) and poly(lactic acid) (PLA); and at least one $2^{nd}$ biodegradable polymer selected from the group consisting of poly(glycolic acid) (PG), poly(butylene succinate) (PBS) and poly(butylene adipate-co-terephthalate)(PBAT). In the above, as the $2^{nd}$ biodegradable polymer, poly(glycolic acid) (PG) and/or poly(butylene adipate-co-terephthalate)(PBAT) may be used more preferably, but it is not limited thereto.

As the cover layer, a film prepared using more than 2 kinds of biodegradable polymers as above, the printability of the cover layer can be further improved.

In case that the cover layer is constituted from more than 2 kinds of biodegradable polymers, the cover layer may comprise 40 to 100 parts by weight of the 2 biodegradable polymer, relative to 100 parts by weight of the $1^{st}$ biodegradable polymer. By controlling the ratio of the $1^{st}$ and $2^{nd}$ biodegradable polymer as above, the printability of the cover layer can be excellently improved with maintaining or improving the other physical properties of the advertising film.

In one embodiment, from a viewpoint of preventing blocking phenomena and adjustment of crystallinity or crystallization rate, the cover layer may further include fillers in an appropriate amount. The examples of the fillers usable herein may comprise at least one selected from the group consisting of an amorphous silica, a zeolite, a magnesium carbonate, a calcium sulfate, a calcium phosphate, a magnesium phosphate, an aluminium oxide, a kaolin, ATH (alumina truhydrate), a talc, a calcium carbonate and a titanium dioxide; and among them, ATH (alumina trihydrate), a talc, a calcium carbonate and/or a titanium dioxide may be preferably used, but it is not limited thereto.

Also, the contents of the fillers are decided considering an aimed physical properties, and not specially limited. In one embodiment, the filler may be included in the cover layer in an amount of 2 to 20 parts by weight, relative to 100 parts by weight of the biodegradable polymer.

In the present invention, methods for manufacturing the cover layer are not specially limited. In one embodiment, the cover layer may be manufactured through conventional casting methods, pressing methods and/or extrusion methods by using raw materials including the biodegradable polymer and/or fillers.

In the present invention, a thickness of the cover layer may be controlled considering an aimed physical properties or its application, and is not specially limited. In one embodiment, the cover layer may have a thickness ranging from about 50 μm to about 200 μm, from about 70 μm to about 150 μm or from about 90 μm to about 120 μm. If the thickness is less than 50 μm, it is apprehended that it becomes hard to apply as an advertising materials due to deterioration of the printability, and if the thickness is more than 200 μm, it is apprehended that mass production becomes hard.

In the present invention, the kinds of the core layer are not specially limited. In one embodiment, the core layer may be one layer or a laminated layer of two or more selected from the group consisting of an adhesive layer, a biodegradable polymer film and a fabric layer.

In the above, the kinds of the adhesive are not specially limited. In one embodiment, as the adhesive, a water-borne adhesive may be used considering an influence on environment. The kinds of the water-borne adhesive usable herein are not specially limited, and the examples thereof comprise conventional polyurethane water-borne adhesive, polyester water-borne adhesive, acryl water-borne adhesive, or ethylene-vinyl acetate water-borne adhesive.

In one embodiment, the core layer may comprise a biodegradable polymer film. In this case, components constituting the biodegradable polymer film and methods for manufacturing the film are not specially limited, and, for example, similar ones as described in the cover layer may be applied.

In one embodiment, the biodegradable polymer film may be a colored film in order to secure a hiding property (property to shield the light). For example, the biodegradable polymer film may be controlled to have an ash color. In this case, methods to control for the biodegradable polymer film to have an ash color are not specially limited, and for instance, methods to add conventional dyes during preparation process may be applied. For example, if dyes such as carbon black and titanium dioxide are appropriately added to raw materials during preparation process, the colored biodegradable polymer film having an ash color may be prepared. In this case, the contents of the dyes are controlled considering an aimed hiding properties, and not specially limited. In one embodiment, the dyes may be added in an amount of 1 to 4 parts by weight, relative to 100 parts by weight of the biodegradable polymer constituting the film.

In the present invention, a thickness of the biodegradable polymer film may be controlled considering an aimed physical properties or its application, and is not specially limited. In one embodiment, the biodegradable polymer film may have a thickness ranging from about 50 μm to about 100 μm.

In one embodiment, the core layer may comprise a fabric layer. By using the fabric layer, various physical properties including mechanical properties and dimension stabilities can be further improved. Specially, if the advertising film is constituted by using biodegradable polymers, the dimension stability may be deteriorated, and therefore exfoliation or peeling phenomena may occur. However, as above, by forming a fabric layer as the core layer, the above problems can be solved.

In one embodiment, the fabric layer may be a fabric of at least one fiber selected from the group consisting of a glass fiber, a carbon fiber, a polyester fiber, polyamide fiber, a polyurethane fiber, an acryl fiber, a polyolefin fiber, a cellulose fiber and a biodegradable polymer fiber. In the present invention, it is preferred that the fabric layer is a fabric of the biodegradable polymer fiber, but it is not limited thereto. In this case, the specific kinds of the biodegradable polymer fiber are not specially limited, and, for example, the same ones as described in the cover layer may be used.

In the present invention, methods to prepare the fabric layer are not specially limited, and, for example, conventional weaving process may be used.

In one embodiment, the fiber constituting the fabric layer may have a thickness ranging from about 150 denier to about 1,000 denier, from about 300 denier to about 800 denier or from about 300 denier to about 600 denier. Also, In one embodiment, the fabric may have a density of not less than (9×9)/(inch×inch), or not less than (15×15)/(inch×inch). By controlling for the dimension of the fabric to be in the above described ranges, the effects improving the physical properties due to the fabric layer may be maximized. In the above, the upper limit of the density of the fabric is not specially limited, and it may be not more than (40×40)/(inch×inch).

In the present invention, a thickness of the fabric layer may be controlled considering an aimed physical properties or its application, and is not specially limited. In one embodiment, the fabric layer may have a thickness ranging from about 50 μm to about 200 μm.

In the present invention, one of the above described layers may constitute the core layer alone, or, in some cases, laminated or hydrid layer of two or more layers may constitute the core layer. Preferably, laminated layer of the colored biodegradable polymer film providing the hiding properties and the fabric layer providing effects improving various properties may be used as the core layer, but it is not limited thereto.

In the present invention, methods for adhering the cover layer to the core layer are not specially limited. For example, the cover layer and the core layer may be adhered by using the above described adhesives or conventional thermal pressing method.

In one embodiment, the advertising film may further include a surface coating layer formed on the cover layer, in order to secure more excellent printability with respect to various solvent inks, and the like. In one embodiment, the surface coating layer may be formed by using water-borne surface coating agents. In the present invention, a thickness of the coating layer may be controlled considering an aimed printability or its application, and is not specially limited. In one embodiment, the coating layer may have a thickness ranging from about 10 μm to about 50 μm, but it is not limited thereto.

Hereinafter, referring to figures attached herein, various embodiments of the advertising film will be described in more detail.

FIGS. 1 to 7 show schematics of various illustrative embodiments of the advertising films.

Figure 2:
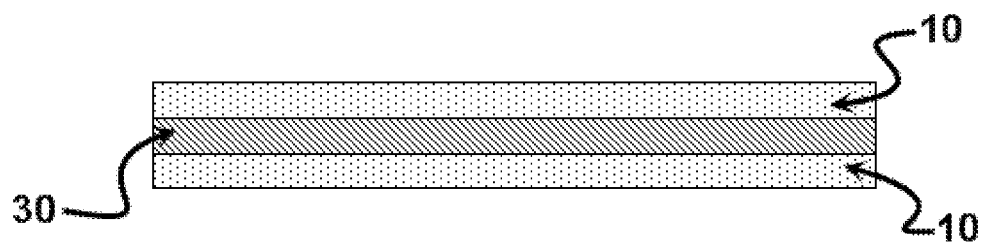

As shown in FIG. 1, the advertising film may include an adhesive layer 20, and cover layers 10 formed on both sides of the adhesive layer 20. Also, as shown in FIG. 2, the advertising film may include a colored biodegradable polymer film 30, which is used for obtaining an effect to shield the light, and cover layers 10 formed on both sides of the biodegradable polymer film 30.

Figure 3:
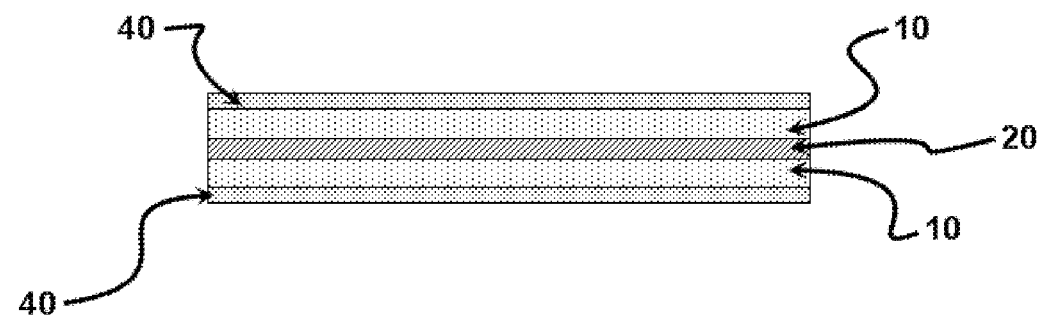
Figure 4:
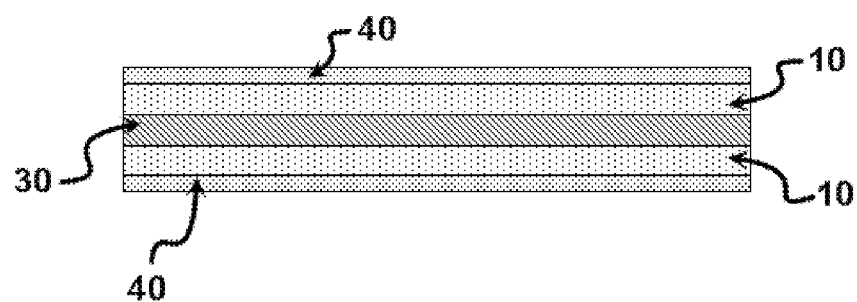

Also, as shown in FIG. 3, the advertising film of the FIG. 1 may further include surface coating layers 40 formed on one side of the cover layers 10. Also, as shown in FIG. 4, the advertising film of the FIG. 2 may further include surface coating layers 40 formed on one side of the cover layers 10.

Figure 5:
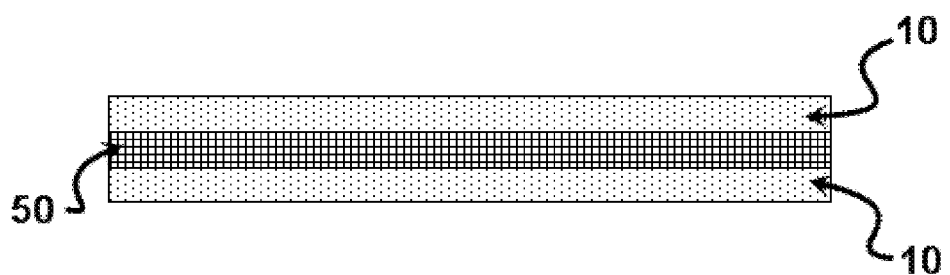
Figure 6:
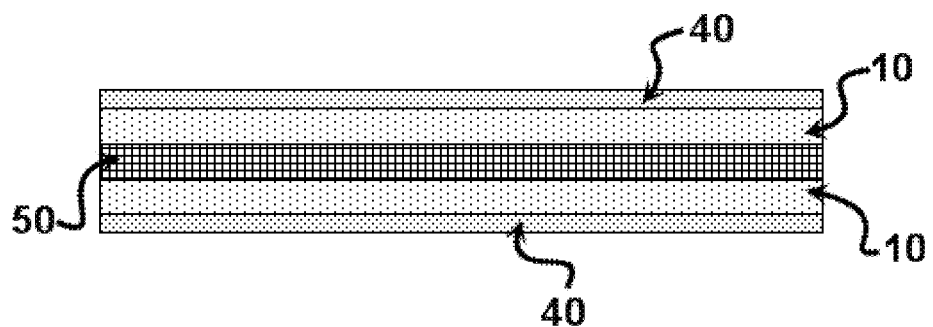

Additionally, as shown in FIG. 5, the advertising film may include an fabric layer 50, which is used for obtaining mechanical properties and dimensional stability, and cover layers 10 formed on both sides of the fabric layer 50. Also, as shown in FIG. 6, the advertising film of FIG. 5 may further include surface coating layers 40 formed on one side of the cover layers 10.

Figure 7:
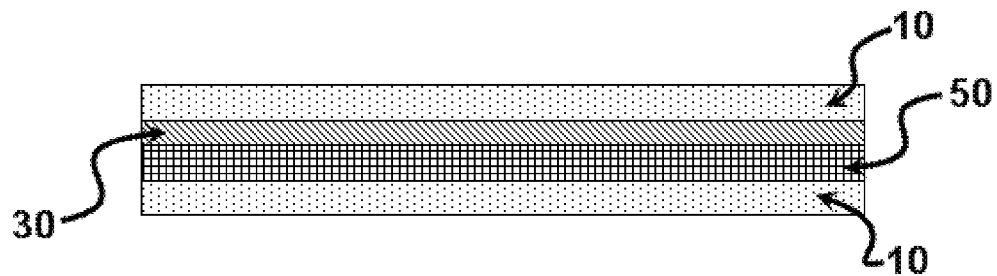

Also, as shown in FIG. 7, the advertising film may include a hybrid layer of a fabric layer 50 and a colored biodegradable polymer layer 30 as the core layer, and cover layers 10 formed on both sides of the core layer.

The advertising film according to FIG. 1 includes the adhesive layer 20 as the core layer; and the cover layers 10 formed on the both sides of the core layer. The cover layers 10 in FIG. 1 include biodegradable polymers, and can be manufactured through conventional casting methods, extrusion methods and/or pressing methods by using raw materials comprising biodegradable polymers, fillers, and the like. In this case, the cover layer 10 may have a thickness ranging from about 50 μm to about 200 μm.

Also, the adhesive layer 20 in FIG. 1 may be constituted by using the above described water-borne adhesive that has environmental friendly properties. The examples of the adhesive, as described above, comprise conventional polyurethane water-borne adhesive, polyester water-borne adhesive, acryl water-borne adhesive, or ethylene-vinyl acetate water-borne adhesive, but are not limited thereto.

The advertising film according to FIG. 2 include a colored biodegradable polymer film 30; and cover layers 10 formed on both sides of the biodegradable polymer film 30.

In this case, methods for manufacturing the biodegradable polymer film 30 are not specially limited, and, for example, the above described methods and raw materials may be applied. In order to obtain the hiding properties, the biodegradable polymer film 30 may have an ash color. In this case, methods to control for the film to have an ash color are not specially limited, and, for example, the above described method, in which dyes are added, may be used.

In this case, the biodegradable polymer film 30 may have a thickness ranging from about 50 μm to about 100 μm.

On the other hand, FIGS. 3 and 4 are cross sections of the advertising films, in which surface coating layers 40 are further formed on one sides of the cover layers 10 in the advertising films of FIGS. 1 and 2.

As shown in FIGS. 3 and 4, by further forming the surface coating layers 40 on the cover layers 10, the printability with respect to solvent inks may be further improved. In this case, methods and raw materials for constituting the surface coating layers 40 are not specially limited, and any conventional ones in the art can be applied.

For example, the surface coating layer may be formed by using various water-borne coating agents or solvent coating agents, which are conventionally used in the field of preparing materials for advertisement.

The examples of the water-borne coating agents may include polyurethane water-borne coating agent or acryl water-borne coating agent, but are not limited thereto. Methods for forming the surface coating layer by using the water-borne coating agents are not specially limited. For example, the surface coating layer may be formed by a process, in which coating solutions are firstly prepared by adding an appropriate fillers to conventional polyurethane-based or acryl-based coating emulsion; the coating solutions are applied on the cover layer through conventional means such as bar coater, spin coater, and the like; and then the coating solutions on the cover layer are dried. In this case, the drying process may be progressed in a temperature of about 80° C. to 200° C. for 30 seconds to 90 seconds. Also, the examples of the fillers added to the emulsion are not specially limited, and may include silica, and the like. Also, the fillers may be added in an amount of 50 to 200 parts by weight, relative to 100 parts by weight of the resin.

Also, the surface coating layer may be formed by using solvent-type coating agent. In this case, the examples of the solvent-type coating agents usable herein are not specially limited, and for example, any conventional solvent-type coating agents, which are used in the poly(vinyl chloride)-based advertising materials, can be used. More concretely, the solvent coating agent may be acryl-based, poly(vinyl chloride)-based, acrylonitrile butadiene styrene (ABS)-based or rubber-based coating agent. The above coating agent may be prepared through a method including dissolving the corresponding resin in appropriate organic solvents (solid contents: about 15% to 30%), and then adding appropriate fillers to the solvents. Also, methods for forming the surface coating layer using the coating agents are not specially limited, and, for example, similar methods as described in the water-borne coating agent may be applied.

The surface coating layer may have a thickness ranging from about 10 μm to about 50 μm. If the thickness is less than 10 μm, it is apprehended that an aimed printability is not obtained, and if the thickness is more than 50 μm, it is apprehended that economical efficiency is lowered.

FIG. 5 shows a schematic of another illustrative embodiment of the advertising film according to the present invention. The advertising film of FIG. 5 includes a fabric layer 50 as the core layer; and cover layers 10 formed on both sides of the core layer. The fabric layer 50 can improve the physical properties such as internal tearing strength, tensile strength and dimensional stability. In this case, methods for forming the fabric layer 50 are not specially limited, and, for example, the above described conventional weaving methods using the fiber can be applied. Also, methods including the fabric layer 50 in the advertising film are not specially limited, and, for example the above described adhesive or thermal pressing method may be applied. In this case, the thickness of the fabric layer may be selected considering an aimed effects improving the physical properties, and, for example, it may have a thickness ranging from about 50 μm to about 200 μm.

FIG. 6 shows a schematic of another illustrative embodiment of the advertising film, in which the surface coating layers 40 are further formed on one sides of the cover layers 10 of the advertising film in FIG. 5. FIG. 7 shows a schematic of another illustrative embodiment of the advertising film including a hybrid layer of a fabric layer 50 and a colored biodegradable polymer layer 30 as the core layer, and cover layers 10 formed on both sides of the core layer.

Methods or raw materials for constituting the advertising films in FIGS. 6 and 7 are not specially limited, and, for example, similar ones as described in the above may be applied.

What is claimed is:
1. A biodegradable film for advertisement, comprising:
a core layer comprising an adhesive layer and a laminated layer of a biodegradable polymer film and a fabric layer, wherein the adhesive layer comprises a water-borne adhesive that is at least one selected from the group consisting of polyurethane water-borne adhesive, acryl water-borne adhesive and ethylene vinyl acetate water-borne adhesive;
a cover layer that is formed on both sides of the core layer and includes biodegradable polymer; and a surface coating layer that is formed on the cover layer and includes water-borne surface coating agents, wherein the biodegradable polymer film has dyes added in order to secure a hiding property, wherein the cover layer comprises at least one 1st biodegradable polymer selected from the group consisting of poly(caprolactone) and poly(lactic acid), and at least one 2nd biodegradable polymer selected from the group consisting of poly(glycolic acid), poly(butylene succinate) and poly(butylene adipate-co-terephthalate), and wherein the cover layer comprises 40 to 100 parts by weight of the 2nd biodegradable polymer, relative to 100 parts by weight of the 1st biodegradable polymer.

2. The biodegradable film for advertisement according to claim 1, wherein the cover layer has a thickness ranging from 50 μm to 200 μm, wherein the biodegradable polymer film has a thickness ranging from 50 μm to 100 μm, wherein the fabric layer has a thickness ranging from 50 μm to 200 μm, and wherein the surface coating layer has a thickness ranging from 10 μm to 50 μm.

3. The biodegradable film for advertisement according to claim 1, wherein the dyes are added in an amount of 1 to 4 parts by weight relative to 100 parts by weight of the biodegradable polymer constituting the biodegradable polymer film.

4. The biodegradable film for advertisement according to claim 1, wherein the fabric layer is a fabric of a biodegradable polymer fiber.

5. The biodegradable film for advertisement according to claim 4, wherein the fiber has a thickness of 150 denier to 1,000 denier.

6. The biodegradable film for advertisement according to claim 4, wherein the fabric has a density of (9×9)/(inch×inch) or more.

* * * * *